United States Patent
Ghosh et al.

(10) Patent No.: US 11,768,674 B2
(45) Date of Patent: Sep. 26, 2023

(54) APPLICATION DEVELOPMENT MECHANISM BASED ON A REFERENCE ARCHITECTURE

(71) Applicant: International Business Machines Corporation, Armonk, NY (US)

(72) Inventors: Partho Ghosh, Kolkata (IN); Sarbajit K. Rakshit, Kolkata (IN); Keerthi Samireddy, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

(21) Appl. No.: 17/491,768

(22) Filed: Oct. 1, 2021

(65) Prior Publication Data
US 2023/0107637 A1    Apr. 6, 2023

(51) Int. Cl.
*G06F 8/65*    (2018.01)
*G06N 5/04*    (2023.01)

(52) U.S. Cl.
CPC ...... *G06F 8/65* (2013.01); *G06N 5/04* (2013.01)

(58) Field of Classification Search
CPC .................................. G06F 8/65; G06N 5/04
See application file for complete search history.

(56) References Cited

U.S. PATENT DOCUMENTS

| | | | | |
|---|---|---|---|---|
| 9,075,688 | B1* | 7/2015 | Challa | G06F 8/65 |
| 11,194,550 | B2* | 12/2021 | Davis | G06F 8/76 |
| 11,467,828 | B1* | 10/2022 | Zhang | H04L 67/34 |
| 2005/0138603 | A1 | 6/2005 | Cha et al. | |
| 2016/0078368 | A1* | 3/2016 | Kakhandiki | G06N 5/04 706/12 |
| 2018/0365008 | A1 | 12/2018 | Chandramouli et al. | |
| 2019/0114210 | A1* | 4/2019 | Han | G06F 9/5077 |
| 2019/0196950 | A1* | 6/2019 | Ranganathan | G06F 8/10 |
| 2019/0392329 | A1 | 12/2019 | Rangarajan et al. | |
| 2020/0387356 | A1* | 12/2020 | Davis | G06F 8/30 |
| 2021/0011688 | A1* | 1/2021 | Sasidharan | G06F 8/10 |
| 2021/0263735 | A1* | 8/2021 | Harishankar | G06F 8/31 |
| 2021/0266907 | A1* | 8/2021 | Cui | H04W 24/10 |
| 2022/0138617 | A1* | 5/2022 | Xiao | G06F 9/45558 706/12 |

OTHER PUBLICATIONS

M. Srinivas et. al., "Analysis of Legacy System in Software Application Development—A Comparative Survey" dated Feb. 2016, International Journal of Electrical and Computer Engineering, vol. 6. No. 1, Total 6 pages.

(Continued)

*Primary Examiner* — Daxin Wu
(74) *Attorney, Agent, or Firm* — KONRAD RAYNES DAVDA & VICTOR LLP; Rabindranth Dutta

(57) ABSTRACT

A reference architecture document and a legacy application are provided. An artificial intelligence enabled application compares the legacy application to the reference architecture document to recommend steps and sequences of operations to align the legacy application with the reference architecture document. The legacy application is updated to conform to requirements indicated in the reference architecture document, based on the recommended steps and sequences of operations.

17 Claims, 11 Drawing Sheets

(56) References Cited

OTHER PUBLICATIONS

Anonymous, "Digital Twin Simulation Based Identifying Microservice Architecture" dated Feb. 15, 2021, An IP.com Prior Art Database Technical Disclosure, for IPCOM000264992D, Total 6 pages.

M. Rehkopf, "User Stories Examples and Template" Atlassian, (online), retrieved from the internet on Aug. 25, 2021 at URL> http:www.atlassian,com/agile/project-manager . . . Total 9 pages.

"Architecture Best Practices for Travel and Hospitality" dated Jul. 2021, Travel & Hospitality AWS Architecture Center, (online) retrieved from the Internet at URL>https://aws.amazon.com/architecture/travel-hospitality . . . Total 6 pages.

"AWS Architecture Center" (online), retrieved from the Internet on Oct. 1, 2021 at URL>https://aws.amazon.com/architecture/, Total 11 pages.

\* cited by examiner

APPLICATION DEVELOPMENT MECHANISM BASED ON A REFERENCE ARCHITECTURE

BACKGROUND

1. Field

Embodiments relate to an application development mechanism based on a reference architecture.

2. Background

Software architectures play a major role in determining system quality since they form the foundation or backbone for any successful software system. A reference architecture is a document or set of documents that provides recommended structures and integrations of information technology products and services to form a solution. The reference architecture may embody accepted industry best practices, and may typically suggest the optimal delivery method for specific technologies. In this context, a reference architecture is a generic architecture for a class of software systems used as a foundation for the design of concrete architectures from this class.

A reference architecture or model provides a common vocabulary, reusable designs, and industry best practices that are used as a constraint for more concrete architectures. Typically, reference architectures may include common architecture principles, patterns, building blocks, and standards. Reference architectures are not solution architectures (i.e., reference architectures are not implemented directly). A reference architecture in the field of software architecture may provide a template solution for an architecture for a domain. The structures and respective elements and relations may provide templates for concrete architectures in a domain. A common vocabulary may be used to discuss implementations, often with the aim to stress commonality. Enterprise Reference Architectures are standardized architectures that provide a frame of reference for a vertical domain or sector. Many domains have their own reference architecture definitions. A customer may have a defined reference architecture. For example, an application service provider may have its own reference architecture, and cloud service providers may also have their own reference architecture.

SUMMARY OF THE PREFERRED EMBODIMENTS

Provided are a method, system, and computer program product in which a reference architecture document and a legacy application are provided. An artificial intelligence enabled application compares the legacy application to the reference architecture document to recommend steps and sequences of operations to align the legacy application with the reference architecture document. The legacy application is updated to conform to requirements indicated in the reference architecture document, based on the recommended steps and sequences of operations.

In further embodiments, in response to determining that a new application is to be developed, the artificial intelligence enabled application analyzes requirement specifications, user stories, and accordingly recommends how to align the new application that is to be developed based on the reference architecture document.

In yet further embodiments, the artificial intelligence enabled application performs a historical analysis of logs generated from a plurality of microservices, user experience feedback, security information, and recommends corrections and updates to the reference architecture document.

In additional embodiments, in response to updating the reference architecture document based on historic analysis of application logs, and advancement and adoption of technologies, the artificial intelligence enabled application identifies how the legacy application is to be aligned with the updated reference architecture document.

In yet additional embodiments, based on a correlation of the reference architecture document and a digital twin of the legacy application, the artificial intelligence enabled application identifies security, configuration, storage limits, non-functional resource, and data pipeline policies to be installed that need to be incorporated in the legacy application to align the legacy application with the reference architecture document.

In certain embodiments, based on the reference architecture document and recommended changes in the legacy application, the artificial intelligence enabled application recommends how different modules of the legacy application are to be implemented and broken down into microservices and how corresponding cloud deployment is to be performed.

In further embodiments, the artificial intelligence enabled application uses computational learning mechanisms in a neural network for generating recommendations, wherein the artificial intelligence enabled application undergoes training to generate the recommendations.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

When any new application is to be developed or any existing legacy application is to be modernized (i.e., updated for a current operating system or updated system) then software developers may follow the corresponding reference architecture and perform the appropriate activities. As a result, it may take a longer time to analyze the application and modernize the application in accordance with the reference architecture.

In certain embodiments, an Artificial Intelligence enabled system may analyze the legacy application, or application development requirements, and compare the same with the reference architecture documents to determine how to modernize the application or the application is to be developed, in order to improve software development in a computational device.

Exemplary Embodiments

Figure 1:
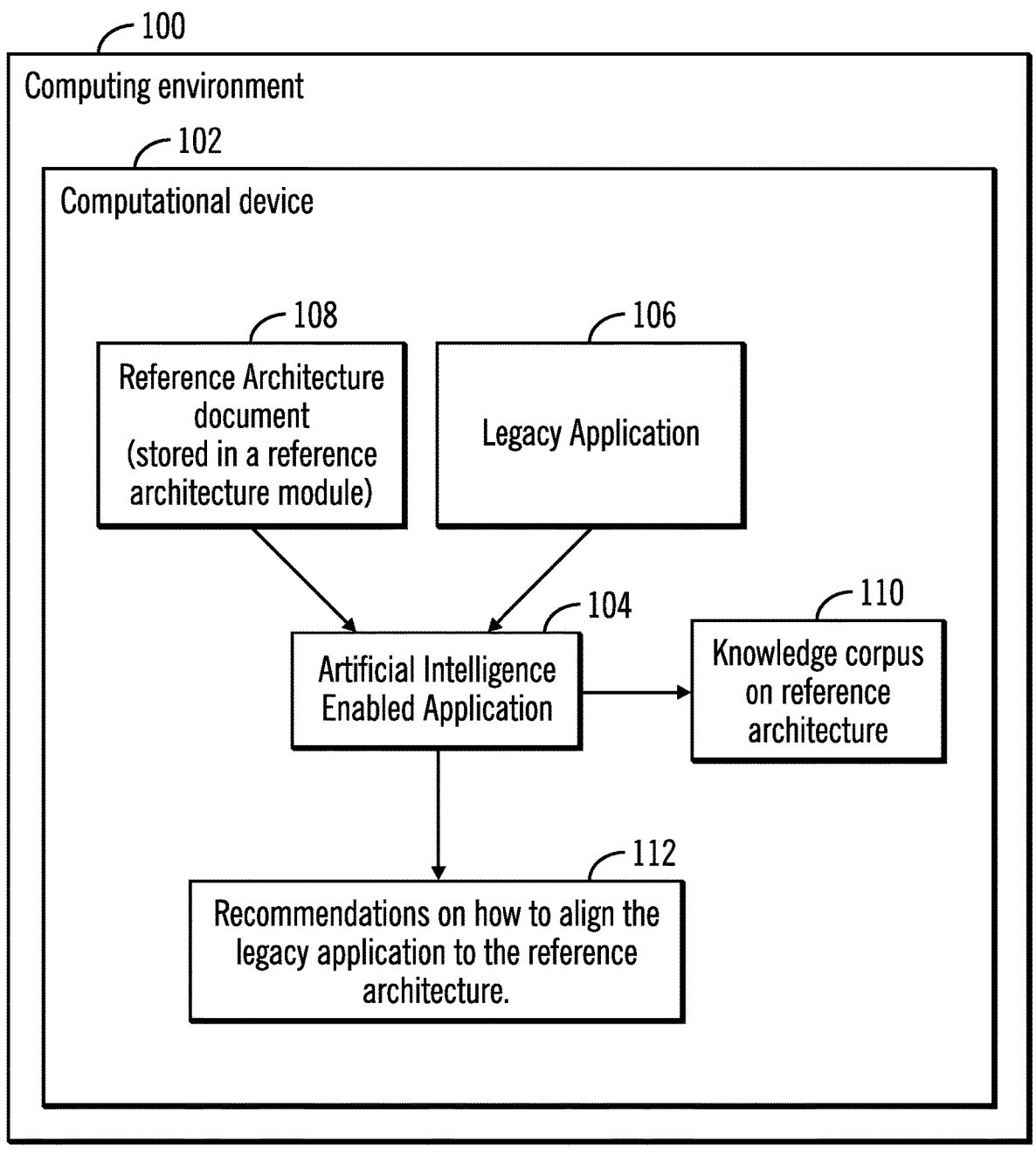
FIG. 1 illustrates a block diagram of a computing environment comprising a computational device that uses an artificial intelligence enabled application to align a legacy application to a reference architecture or to develop a new application in conformance with a reference architecture, in accordance with certain embodiments.

FIG. 1 illustrates a block diagram of a computing environment 100 comprising a computational device 102 that executes an artificial intelligence enabled application 104 for modification of a legacy application 106 to align the legacy application 106 to a reference architecture, in accordance with certain embodiments.

The computational device 102 includes a reference architecture document 108 that may be a stored in a reference architecture module to which the artificial intelligence enabled application 104 is able to interface and generate a knowledge corpus 110 on the reference architecture and recommendations on how to align the legacy application 106 to the reference architecture (as shown via reference numeral 112).

The legacy application 106 may be an application that was developed in the past and that needs to be updated to conform to an updated or new reference architecture document 108. The artificial intelligence enabled application 104 that facilitates the updates to the legacy application 106 may be implemented in software, firmware, hardware or any combination thereof.

The computational device 102 may comprise any suitable computational device including those presently known in the art, such as, a personal computer, a workstation, a server, a mainframe, a hand held computer, a palm top computer, a telephony device, a network appliance, a blade computer, a processing device, a controller, etc.

The computational device 102 may be an element in any suitable network, such as, a storage area network, a wide area network, the Internet, an intranet, etc. In certain embodiments, the computational device 102 may be an element in a cloud computing environment.

Certain embodiments employ the artificial intelligence enabled application 104 to analyze one or more legacy applications, or an application's development requirements, and compares the same with reference architecture documents 108. The reference architecture documents 108 include diagrams, names of technologies, implementation steps, workflows, textual information, best practices, etc., to recommend how to align and modernize the legacy application with the reference architecture, and how to align a new application that is to be developed with the reference architecture.

The artificial intelligence enabled application 104 compares the reference architecture documents 108 of any business function and/or technical implementation with the architecture and implementation of the legacy application 106, and recommends how the legacy application 106 is to be aligned with the reference architecture. Appropriate steps and the sequence of aligning the legacy application 106 with the reference architecture are recommended, so that the application modernization can be performed in an optimized manner.

In certain embodiments, when any new application is to be developed, the artificial intelligence enabled application analyzes the requirement specifications, user stories, and recommends how to align the application that is to be developed based on reference architecture documents 108.

In certain embodiments, the artificial intelligence enabled application performs an analysis of the historically generated the log from various microservices, user experience feedback, security information, etc., and recommends if the reference architecture is to be evolved, and further recommends the corrections and updates to reference architecture.

In other embodiments, in response to the updating the reference architecture based on historic usage captured in the application logs, advancement of technologies, adoption of the technologies etc., the artificial intelligence enabled application 104 identifies how the applications are to be aligned with the updated reference architecture.

In further embodiments, based on the correlation of the reference architecture and to the legacy application, the artificial intelligence enabled application 104 identifies the security, configuration, storage limits, non-functional resource, data pipeline policies, etc., that need to be incorporated in the legacy application 106 to align the legacy application 106 to the reference architecture. Based on the reference architecture and the recommended changes in the legacy application, the artificial intelligence enabled application 104 may recommend how different modules of the legacy application 112 are to be implemented/or broken down into microservices and how any further corresponding cloud deployment is to be performed.

Figure 2:
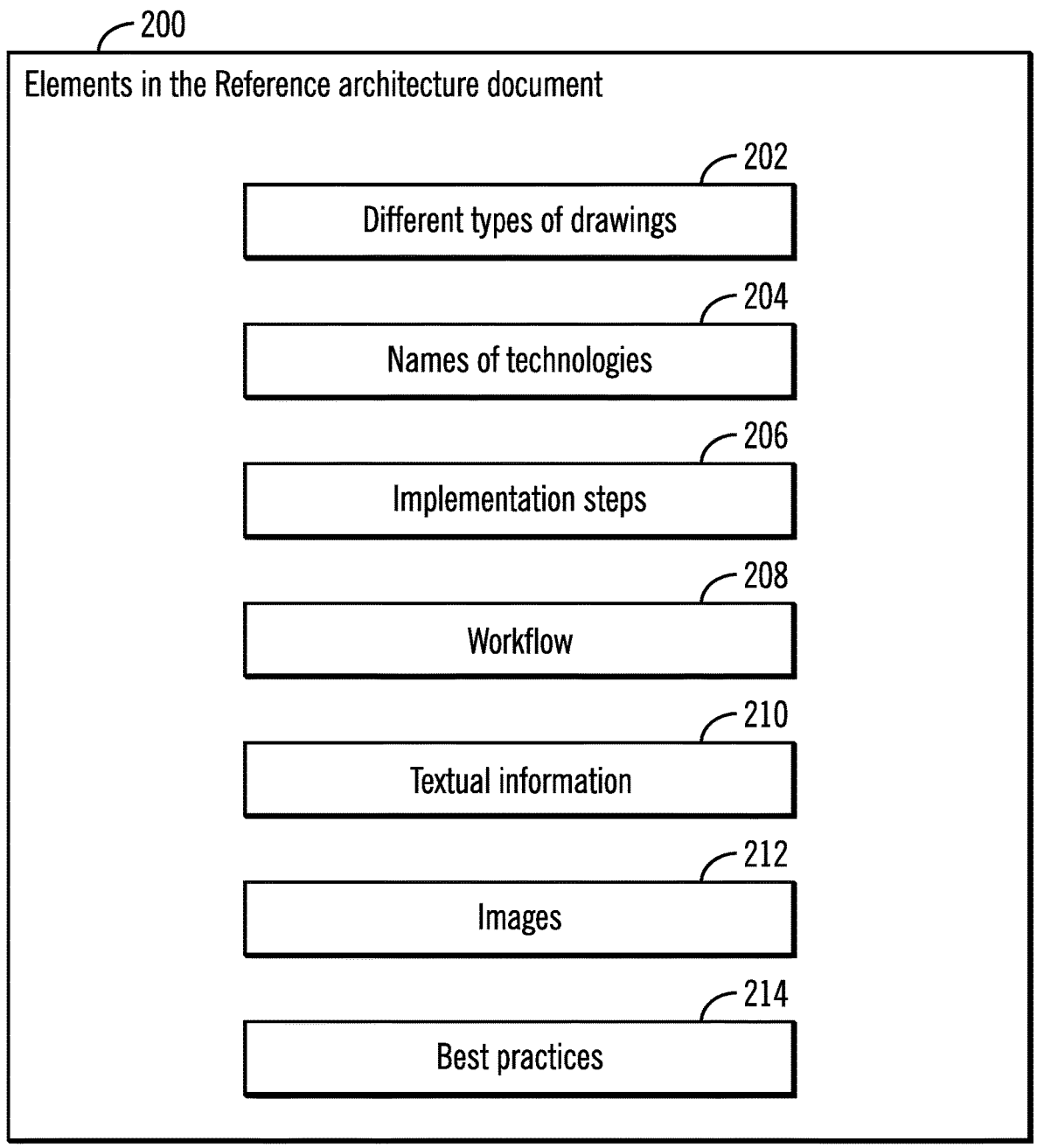
FIG. 2 illustrates a block diagram that shows examples of different elements in a reference architecture document, in accordance with certain embodiments.

FIG. 2 illustrates a block diagram 200 that shows examples of different elements in a reference architecture document 108, in accordance with certain embodiments.

The reference architecture document 108 may include many different types of drawings that provides designs for the reference of a reference system to which applications need to conform (reference numeral 202). Names of technologies 204, implementation steps 206, workflow 208 may be found in the reference architecture document 108.

The information in the reference architecture document 108 may be represented as textual information 210 and as images 212. The best practices 214 to be followed for development of applications may also be listed in the reference architecture document 108. It is emphasized that many other additional elements may be included in the reference architecture document 108 besides the ones shown in FIG. 2.

Figure 3:
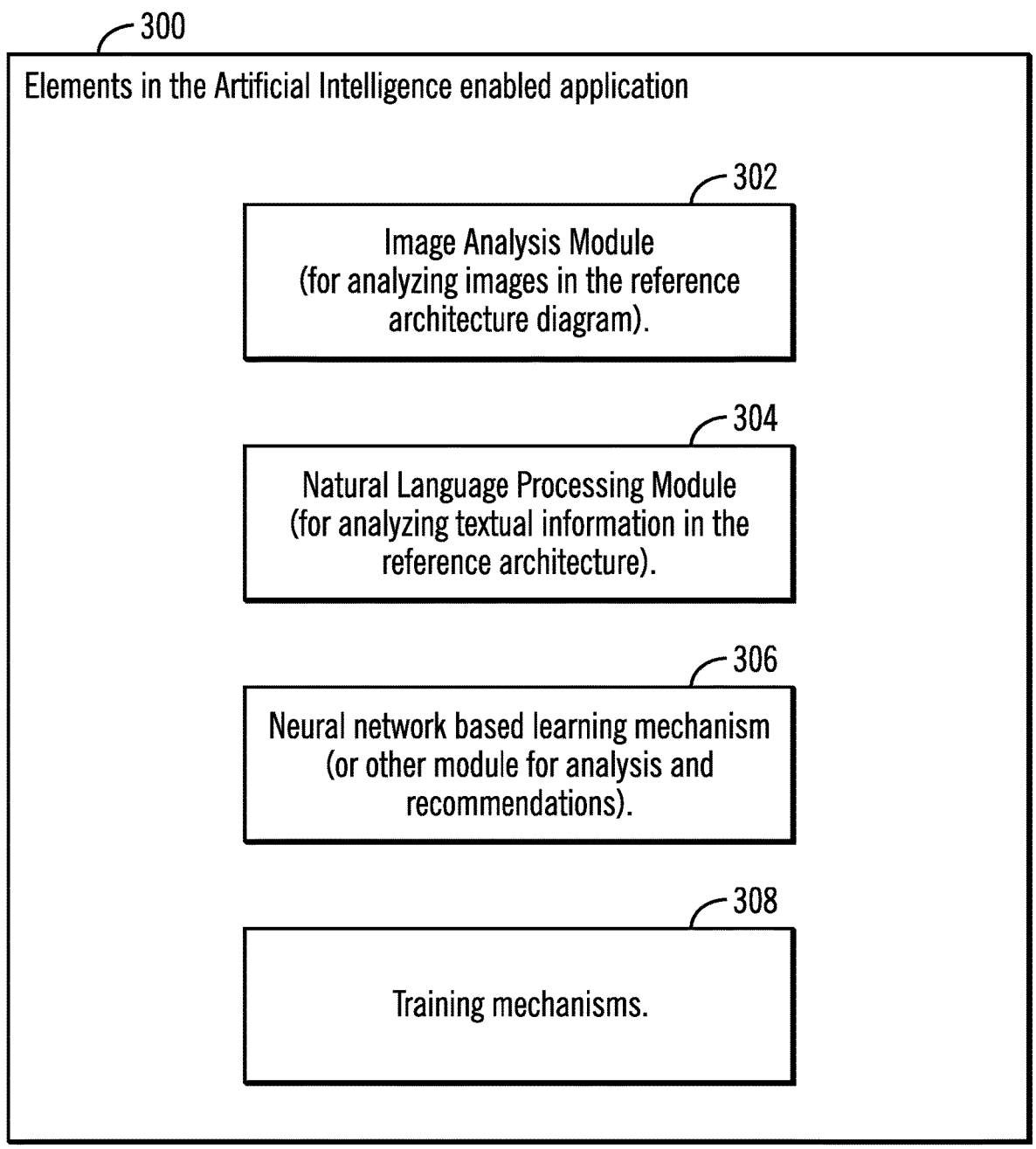
FIG. 3 illustrates a block diagram that shows exemplary elements in an artificial intelligence enabled application, in accordance with certain embodiments.

FIG. 3 illustrates a block diagram 300 that shows exemplary elements in an artificial intelligence enabled application 104, in accordance with certain embodiments.

The artificial intelligence enabled application 104 may include an image analysis module 302 for analyzing the images 212 in the reference architecture document 108. The artificial intelligence enabled application 104 may also include a natural language processing module 304 for analyzing textual information 210 in the reference architecture document 108.

The artificial intelligence enabled application 104 may be implemented as a neural network based learning mechanism 306 that may be trained via a training mechanism 308 in certain embodiments. In other embodiments, other mechanisms for analysis and providing recommendations besides neural network based learning mechanisms may be employed.

Figure 4:
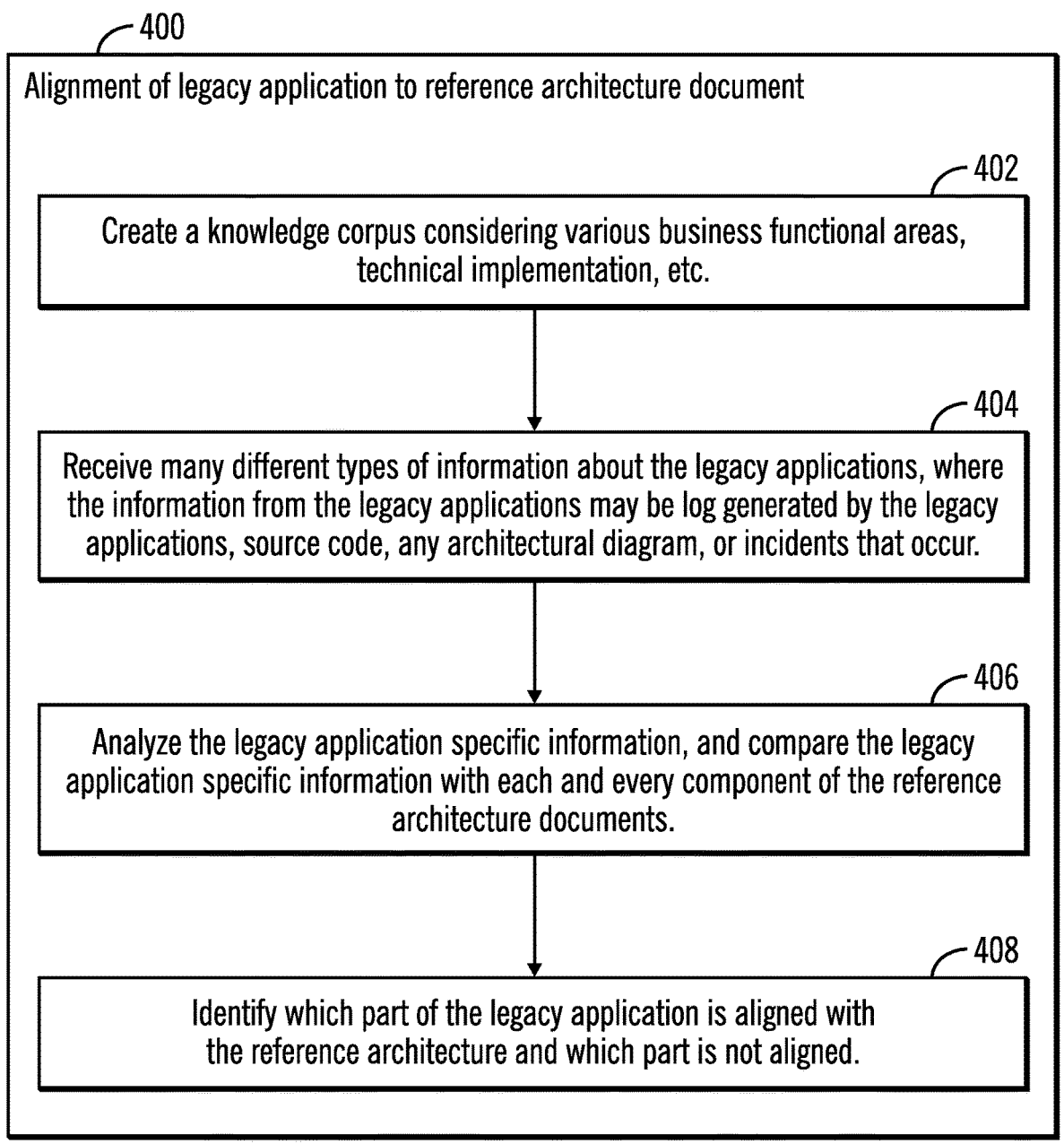
FIG. 4 illustrates a first flowchart that shows exemplary operations performed by the artificial intelligence enabled application, in accordance with certain embodiments.

FIG. 4 illustrates a first flowchart 400 that shows exemplary operations for alignment of legacy application to reference architecture performed by the artificial intelligence enabled application 104, in accordance with certain embodiments. The operations shown in FIG. 4 may be performed in the computational device 102 by the artificial intelligence enabled application 104.

Control starts at block 402 in which the artificial intelligence enabled application 104 creates a knowledge corpus considering various business functional areas, technical implementation, etc. Control proceeds to block 404 in which the artificial intelligence enabled application 104 receives many different types of information about the legacy applications, where the information from the legacy applications may be log generated by the legacy applications, source code, any architectural diagram, or incidents that occur.

From block 406 control proceeds to block 408 in which the artificial intelligence enabled application 104 analyzes the legacy application specific information, and compares the legacy application specific information with each and every component of the reference architecture documents 108.

From block 406 control proceeds to block 408 in which the artificial intelligence enabled application 104 identifies which part of the legacy application 106 is aligned with the reference architecture and which part is not aligned, where alignment of the legacy application to the reference architecture refers to conformance of the legacy application to the requirements indicated in the reference architecture.

Figure 5:
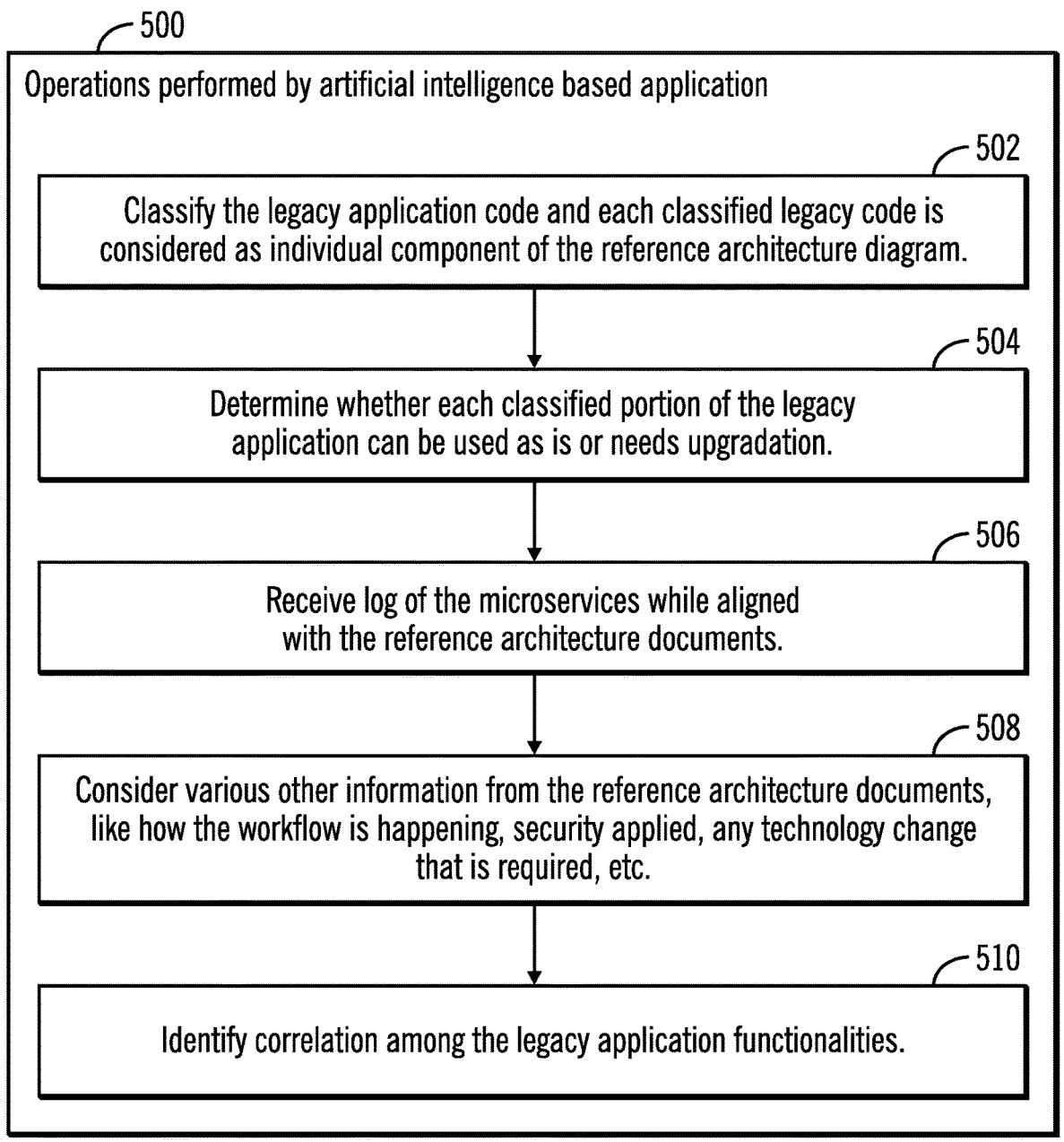
FIG. 5 illustrates a second flowchart that shows exemplary operations performed by the artificial intelligence enabled application, in accordance with certain embodiments.

FIG. 5 illustrates a second flowchart 500 that shows exemplary operations performed by the artificial intelligence enabled application 104, in accordance with certain embodiments. The operations shown in FIG. 5 may be performed in the computational device 102 by the artificial intelligence enabled application 104.

Control starts at block 502 in which the artificial intelligence enabled application 104 classifies the legacy application code and each classified legacy code is considered as individual component of the reference architecture diagram. Control proceeds to block 504 in which the artificial intelligence enabled application 104 determines whether each classified portion of the legacy application can be used as is or needs upgradation.

At block 506 the artificial intelligence enabled application 104 receives logs of the microservices while aligned with the reference architecture documents. Microservices is an application architectural style in which an application is composed of many discrete, network-connected components that are called microservices. In microservices large monolithic applications are broken into small services. A single network-accessible service is the smallest deployable unit for a microservices application. In microservices based reference architecture each service runs in its own process. This rule, sometimes stated as "one service per container," may be a container or any other lightweight deployment mechanism.

Control continues to block 508 in which the artificial intelligence enabled application 104 considers various other information from the reference architecture documents, like how the workflow is happening, the security applied, any technology change that is required, etc. Control proceeds to block 510 in which the artificial intelligence enabled application 104 identifies correlation among the legacy application functionalities.

Figure 6:
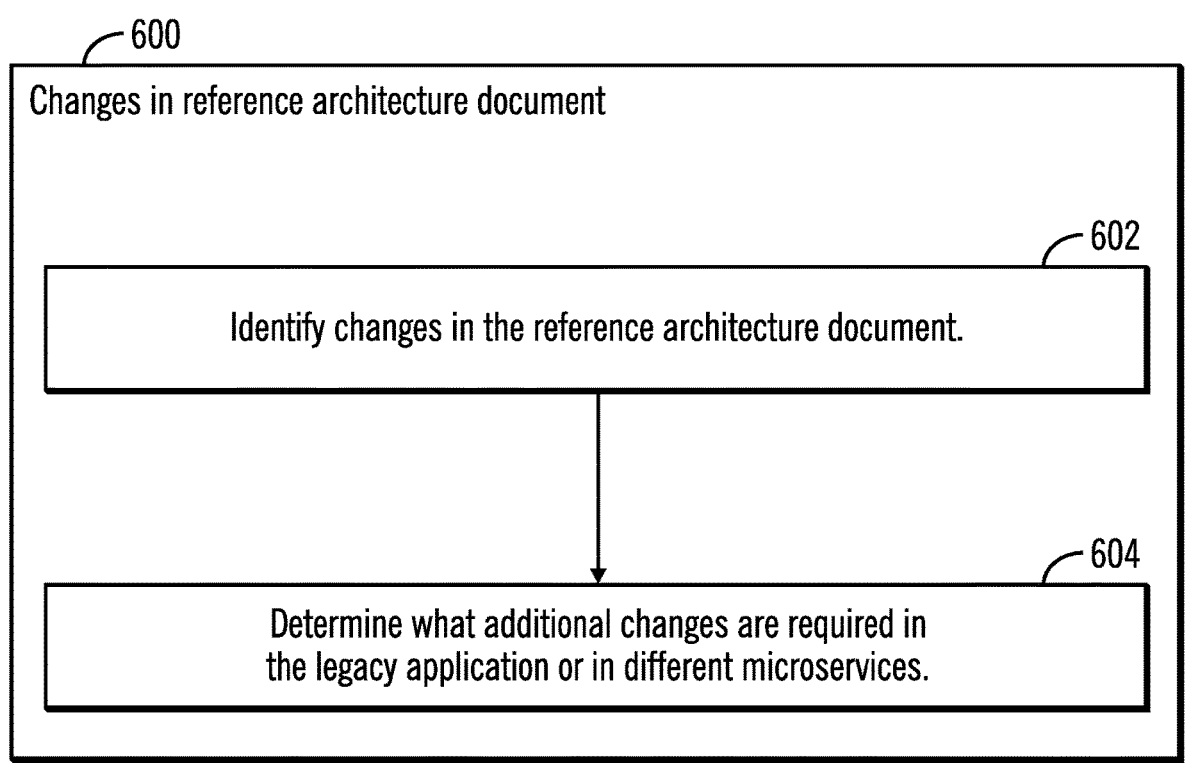
FIG. 6 illustrates a third flowchart that shows exemplary operations performed by the artificial intelligence enabled application in response to changes in the reference architecture document, in accordance with certain embodiments.

FIG. 6 illustrates a third flowchart 600 that shows exemplary operations performed by the artificial intelligence enabled application 104 in response to changes in the reference architecture document, in accordance with certain embodiments. The operations shown in FIG. 6 may be performed in the computational device 102 by the artificial intelligence enabled application 104.

Control starts at block 602 in which the artificial intelligence enabled application 104 identifies changes in the reference architecture document 108. Control proceeds to block 604 in which the artificial intelligence enabled application 104 determines what additional changes are required in the legacy application or in different microservices.

Figure 7:
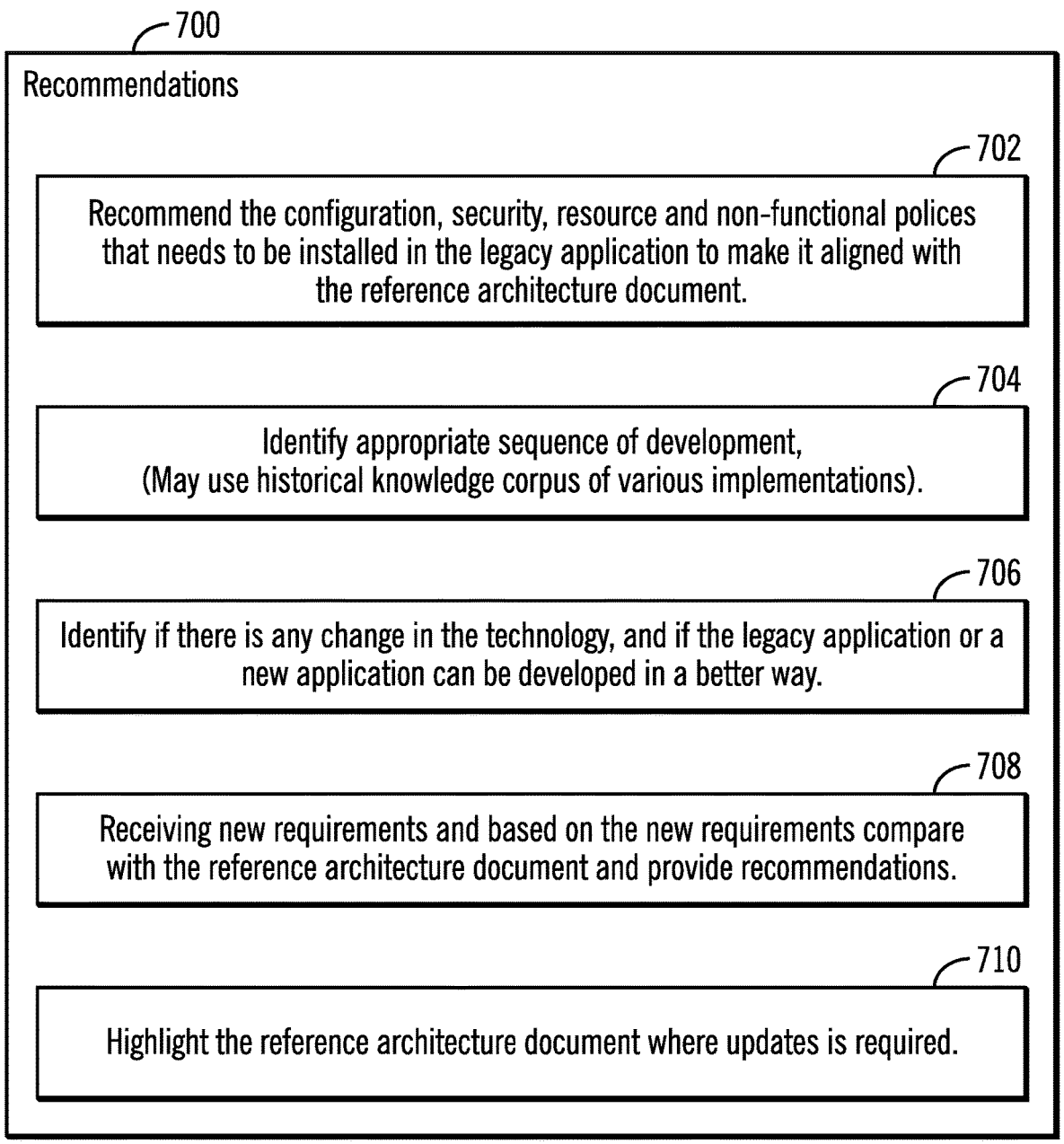
FIG. 7 illustrates a block diagram that shows exemplary recommendations made by the artificial intelligence enabled application, in accordance with certain embodiments.

FIG. 7 illustrates a block diagram 700 that shows exemplary recommendations made by the artificial intelligence enabled application 104, in accordance with certain embodiments.

In certain embodiments shown via reference numeral 702, the artificial intelligence enabled application 104 recommends the configuration, security, resource and non-functional polices that needs to be installed in the legacy application 106 to make the legacy application 106 aligned with the reference architecture document 108.

In other embodiments shown via reference numeral 704, the artificial intelligence enabled application 104 identifies appropriate sequence of development and to perform the operations may use the historical knowledge corpus of various implementations. In further embodiments shown via reference numeral 706, the artificial intelligence enabled application 104 identifies if there is any change in the technology, and if the legacy application or a new application can be developed in a better way In certain embodiments shown via reference numeral 708, the artificial intelligence enabled application 104 receives new requirements and based on the new requirements compares the legacy application with the reference architecture document and provides recommendations. In other embodiments shown via reference numeral 710, the artificial intelligence enabled application 104 highlights the reference architecture document where updates are required.

Figure 8:
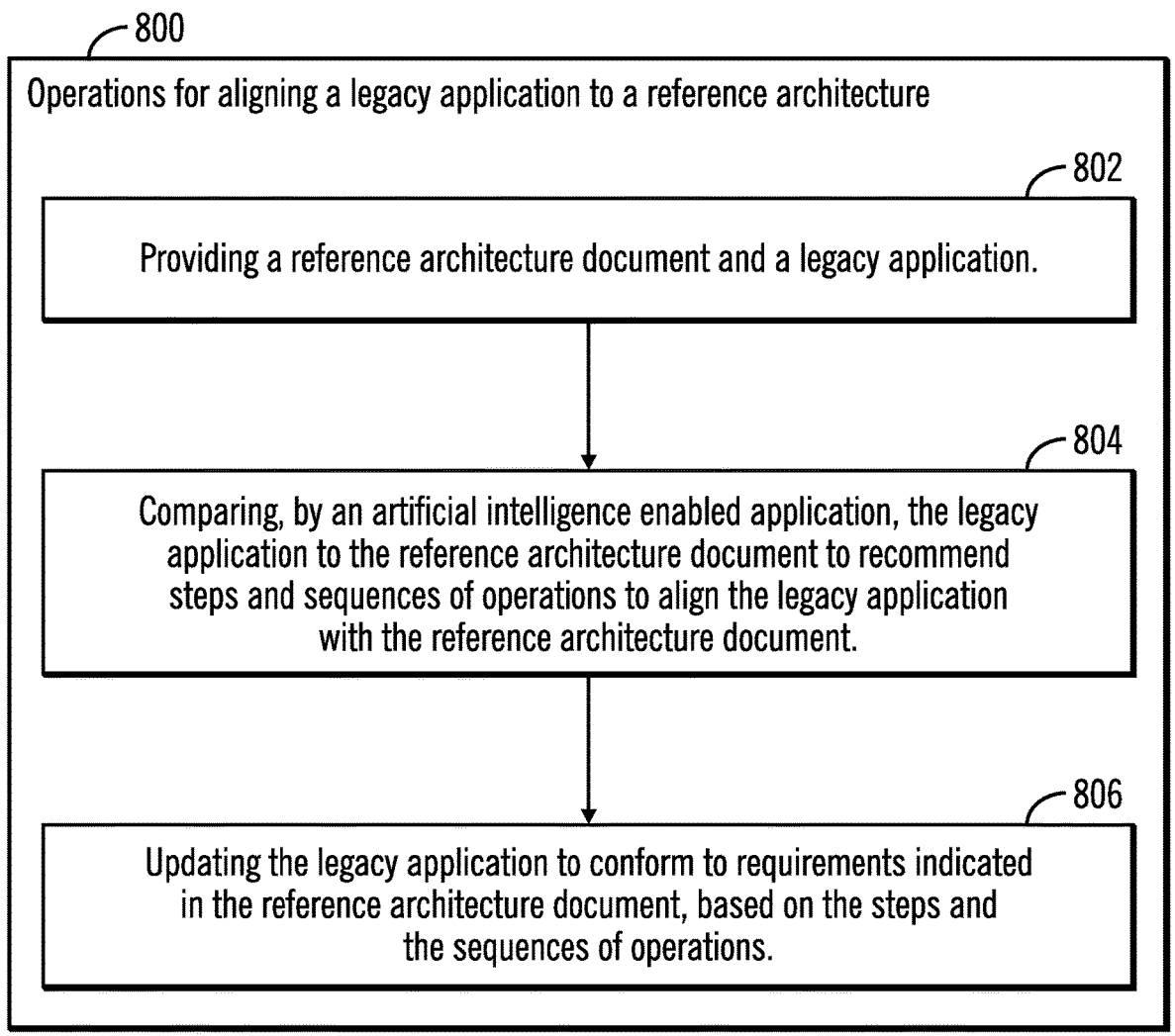
FIG. 8 illustrates a fourth flowchart that shows exemplary operations performed by the artificial intelligence enabled application to align a legacy application to a reference architecture document, in accordance with certain embodiments.

FIG. 8 illustrates a fourth flowchart 800 that shows exemplary operations performed by the artificial intelligence enabled application 104 and potentially by other applications to align a legacy application to a reference architecture document, in accordance with certain embodiments. The operations shown in FIG. 8 may be performed in the computational device 102 by the artificial intelligence enabled application 104 and potentially by other applications.

Control starts at block 802 in which a reference architecture document 108 and a legacy application 106 are provided. An artificial intelligence enabled application 104 compares the legacy application 106 to the reference architecture document 108 to recommend (at block 804) steps and sequences of operations to align the legacy application 106 with the reference architecture document 108.

From block 804 control proceeds to block 806 in which the legacy application 106 is updated to conform to requirements indicated in the reference architecture document 108, based on the recommended steps and sequences of operations.

In further embodiments, in response to determining that a new application is to be developed, the artificial intelligence enabled application analyzes requirement specifications, user stories, and accordingly recommends how to align the new application that is to be developed based on the reference architecture document. The artificial intelligence enabled application performs a historical analysis of logs generated from a plurality of microservices, user experience feedback, security information, and recommends corrections and updates to the reference architecture document. In response to updating the reference architecture document based on historic analysis of application logs, advancement and adoption of technologies, the artificial intelligence enabled application identifies how the legacy application is to be aligned with the updated reference architecture document.

In certain embodiments, based on a correlation of the reference architecture document and a digital twin of the legacy application, the artificial intelligence enabled application identifies security, configuration, storage limits, non-functional resource, and data pipeline policies to be installed that need to be incorporated in the legacy application to align the legacy application with the reference architecture document. In certain embodiments, based on the reference architecture document and recommended changes in the legacy application, the artificial intelligence enabled application recommends how different modules of the legacy application are to be implemented and broken down into microservices and how corresponding cloud deployment is to be performed.

In further embodiments, the artificial intelligence enabled application uses computational learning mechanisms in a neural network for generating recommendations, wherein the artificial intelligence enabled application undergoes training to generate the recommendations.

Therefore, FIGS. 1-8 illustrate certain embodiments in which an artificial intelligence enabled application aligns a legacy application to a reference architecture.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
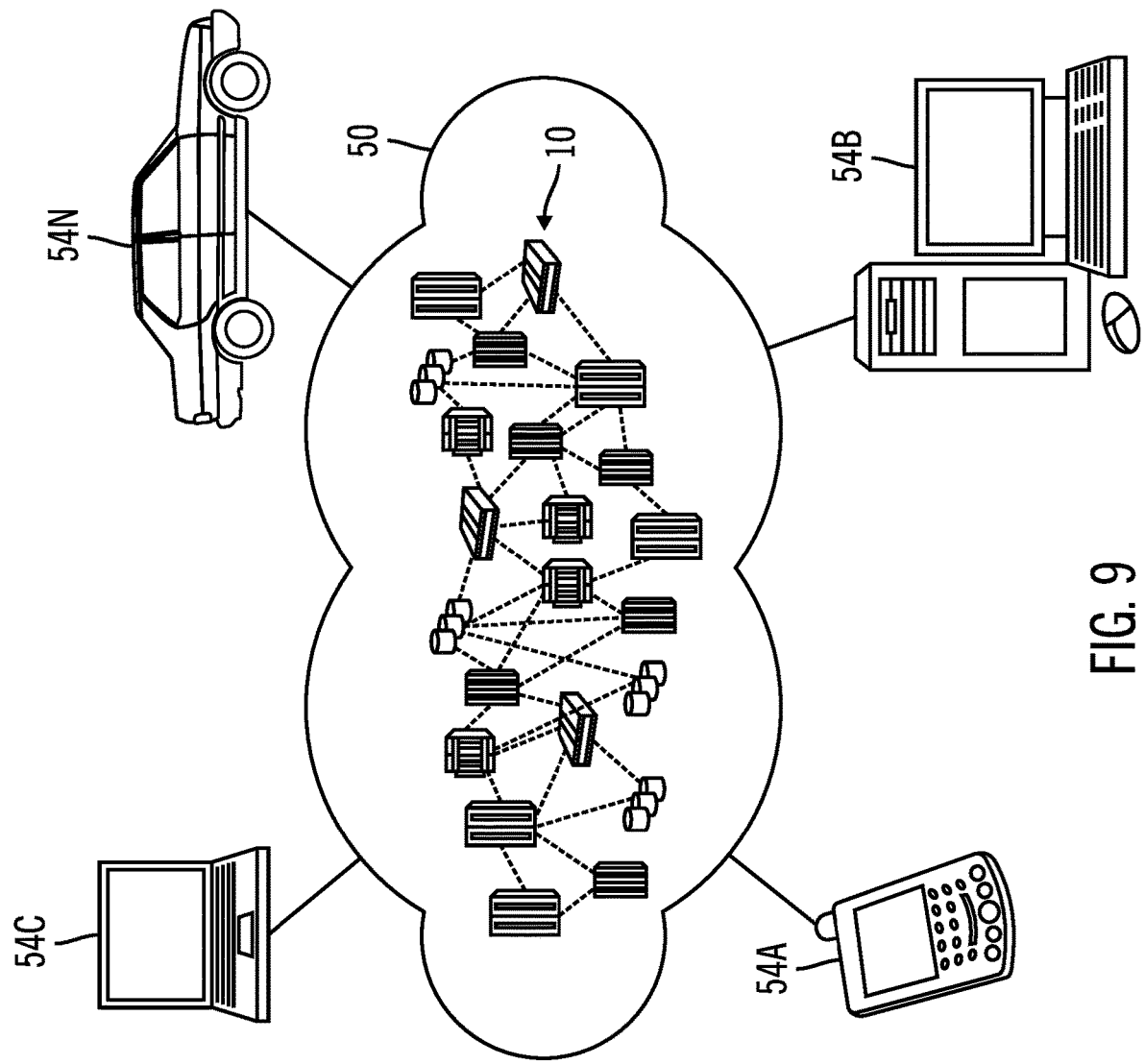
FIG. 9 illustrates a block diagram of a cloud computing environment, in accordance with certain embodiments.

Referring now to FIG. 9, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
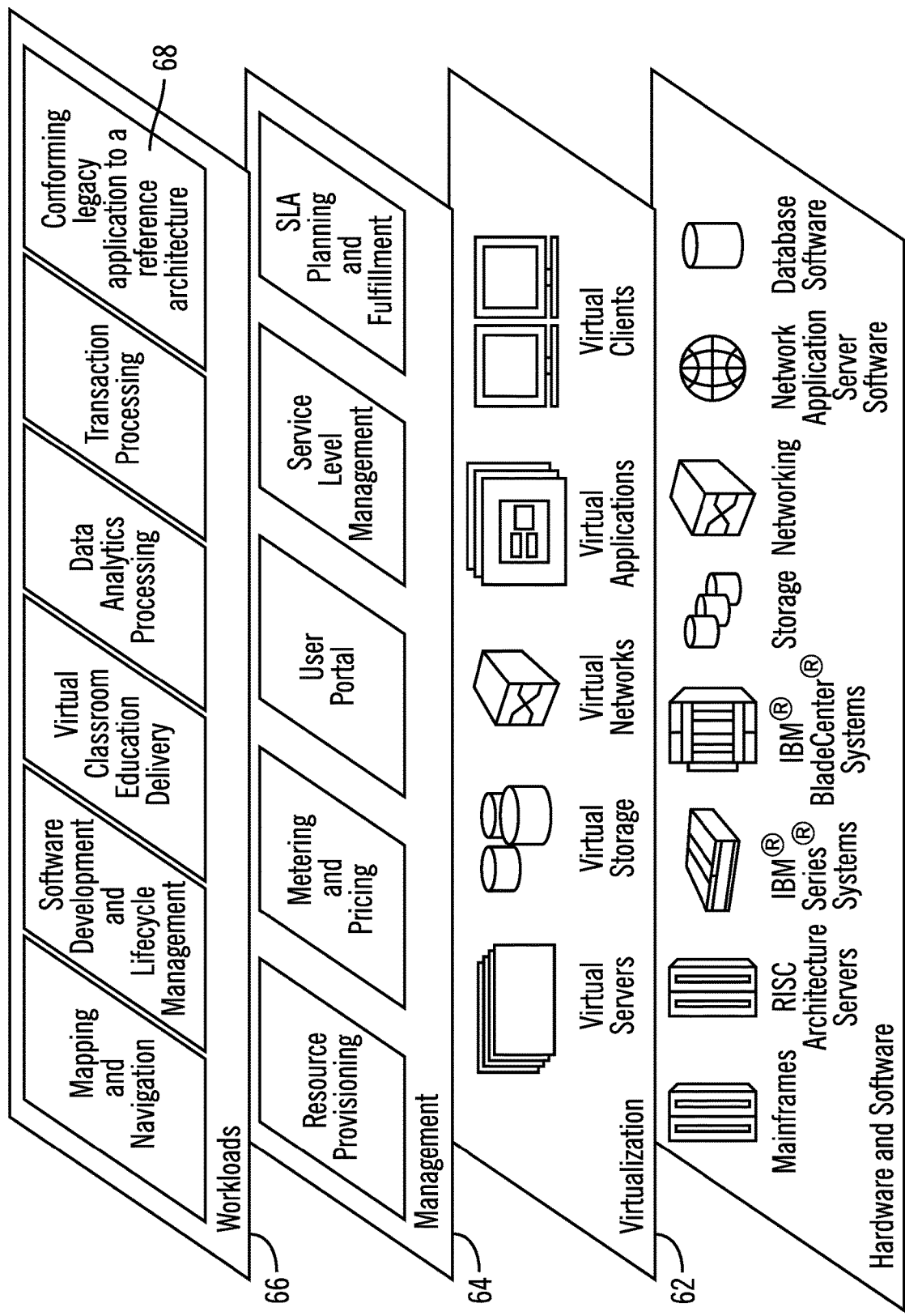
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries*systems; RISC (Reduced Instruction Set Computer) architecture based servers, in one example IBM pSeries*systems; IBM xSeries*systems; IBM BladeCenter*systems; storage devices; networks and networking components. Examples of software components include network application server software, in one example IBM Web Sphere*application server software; and database software, in one example IBM DB2*database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and conforming legacy application to a reference architecture 68 as shown in FIGS. 1-10.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
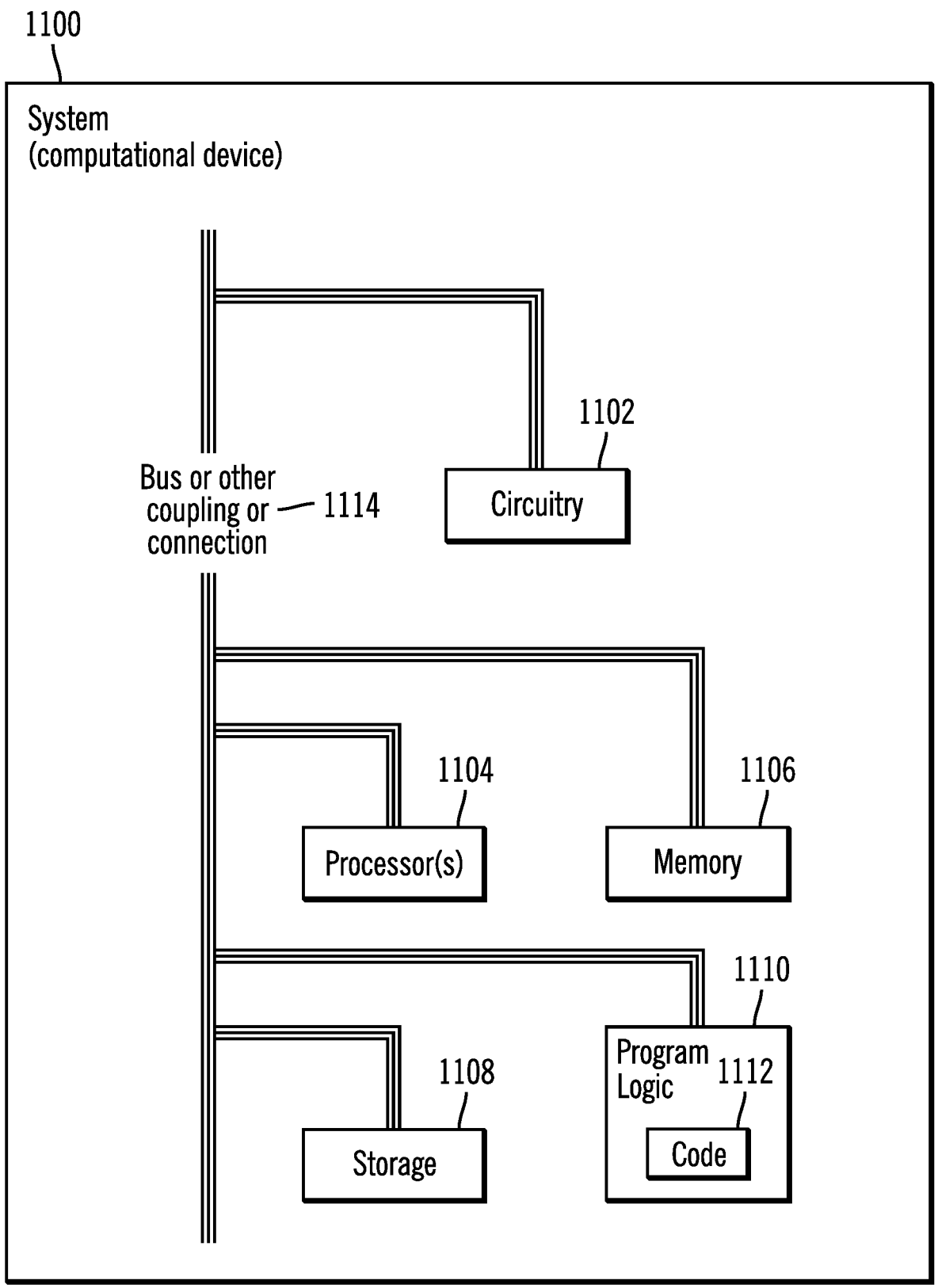
FIG. 11 illustrates a block diagram of a computational system that shows certain elements that may be included in the computational device described in FIGS. 1-10, in accordance with certain embodiments.

FIG. 11 illustrates a block diagram that shows certain elements that may be included in the computational device 102 in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
providing a reference architecture document and a legacy application;
comparing, by an artificial intelligence enabled application, the legacy application to the reference architecture document to recommend steps and sequences of operations to align the legacy application with the reference architecture document; and
updating the legacy application to conform to requirements indicated in the reference architecture document, based on the recommended steps and sequences of operations, wherein the artificial intelligence enabled application performs a historical analysis of logs generated from a plurality of microservices, user experience feedback, and security information, and recommends corrections and updates to the reference architecture document.

2. The method of claim 1, the method further comprising:
in response to determining that a new application is to be developed, analyzing, by the artificial intelligence enabled application, requirement specifications, user stories, and accordingly recommending how to align the new application that is to be developed based on the reference architecture document.

3. The method of claim 1, the method further comprising:
in response to updating the reference architecture document based on historic analysis of application logs, advancement and adoption of technologies, identifying, by the artificial intelligence enabled application, how the legacy application is to be aligned with the updated reference architecture document.

4. The method of claim 1, the method further comprising:
based on a correlation of the reference architecture document and a digital twin of the legacy application, identifying, by the artificial intelligence enabled application, security, configuration, storage limits, non-functional resource, and data pipeline policies to be installed that need to be incorporated in the legacy application to align the legacy application with the reference architecture document.

5. The method of claim 1, the method further comprising:
based on the reference architecture document and recommended changes in the legacy application, recommending, by the artificial intelligence enabled application, how different modules of the legacy application are to be implemented and broken down into microservices and how corresponding cloud deployment is to be performed.

6. The method of claim 1, wherein the artificial intelligence enabled application uses computational learning mechanisms in a neural network for generating recommendations, and wherein the artificial intelligence enabled application undergoes training to generate the recommendations.

7. A system, comprising:
a memory; and
a processor coupled to the memory, wherein the processor performs operations, the operations comprising:
providing a reference architecture document and a legacy application;
comparing, by an artificial intelligence enabled application, the legacy application to the reference architecture document to recommend steps and sequences of operations to align the legacy application with the reference architecture document; and
updating the legacy application to conform to requirements indicated in the reference architecture document, based on the recommended steps and sequences of operations, wherein the artificial intelligence enabled application performs a historical analysis of logs generated from a plurality of microservices, user experience feedback, and security information, and recommends corrections and updates to the reference architecture document.

8. The system of claim 7, the operations further comprising:
in response to determining that a new application is to be developed, analyzing, by the artificial intelligence enabled application, requirement specifications, user stories, and accordingly recommending how to align the new application that is to be developed based on the reference architecture document.

9. The system of claim 7, the operations further comprising:
in response to updating the reference architecture document based on historic analysis of application logs, advancement and adoption of technologies, identifying, by the artificial intelligence enabled application, how the legacy application is to be aligned with the updated reference architecture document.

10. The system of claim 7, the operations further comprising:
based on a correlation of the reference architecture document and a digital twin of the legacy application, identifying, by the artificial intelligence enabled application, security, configuration, storage limits, non-functional resource, and data pipeline policies to be installed that need to be incorporated in the legacy application to align the legacy application with the reference architecture document.

11. The system of claim 7, the operations further comprising:
based on the reference architecture document and recommended changes in the legacy application, recommending, by the artificial intelligence enabled application, how different modules of the legacy application are to be implemented and broken down into microservices and how corresponding cloud deployment is to be performed.

12. The system of claim 7, wherein the artificial intelligence enabled application uses computational learning mechanisms in a neural network for generating recommendations, and wherein the artificial intelligence enabled application undergoes training to generate the recommendations.

13. A computer program product, the computer program product comprising a computer readable storage medium having computer readable program code embodied therewith, the computer readable program code configured to perform operations, the operations comprising:
providing a reference architecture document and a legacy application;
comparing, by an artificial intelligence enabled application, the legacy application to the reference architecture document to recommend steps and sequences of operations to align the legacy application with the reference architecture document; and
updating the legacy application to conform to requirements indicated in the reference architecture document, based on the recommended steps and sequences of operations, wherein the artificial intelligence enabled application performs a historical analysis of logs generated from a plurality of microservices, user experience feedback, and security information, and recommends corrections and updates to the reference architecture document.

14. The computer program product of claim 13, the operations further comprising:
in response to determining that a new application is to be developed, analyzing, by the artificial intelligence enabled application, requirement specifications, user stories, and accordingly recommending how to align the new application that is to be developed based on the reference architecture document.

15. The computer program product of claim 13, the operations further comprising:
in response to updating the reference architecture document based on historic analysis of application logs, advancement and adoption of technologies, identifying, by the artificial intelligence enabled application, how the legacy application is to be aligned with the updated reference architecture document.

16. The computer program product of claim 13, the operations further comprising:
based on a correlation of the reference architecture document and a digital twin of the legacy application, identifying, by the artificial intelligence enabled application, security, configuration, storage limits, non-functional resource, and data pipeline policies to be installed that need to be incorporated in the legacy application to align the legacy application with the reference architecture document.

17. The computer program product of claim 13, the operations further comprising:
based on the reference architecture document and recommended changes in the legacy application, recommending, by the artificial intelligence enabled application, how different modules of the legacy application are to be implemented and broken down into microservices and how corresponding cloud deployment is to be performed.

* * * * *